(12) United States Patent
Brandt et al.

(10) Patent No.: US 6,871,131 B2
(45) Date of Patent: Mar. 22, 2005

(54) TRANSMISSION SYSTEMS

(75) Inventors: Martin Brandt, Thalmassing (DE); Bard Vestgard, Lier (NO); Gunter Hirt, Kongsberg (NO)

(73) Assignee: LuK Lamellen und kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/716,164

(22) Filed: Nov. 17, 2003

(65) Prior Publication Data

US 2004/0138800 A1 Jul. 15, 2004

Related U.S. Application Data

(63) Continuation of application No. PCT/DE02/01720, filed on May 14, 2002.

(30) Foreign Application Priority Data

May 19, 2001 (GB) ................................................ 0112295

(51) Int. Cl.⁷ .............................. B60K 41/06; F16H 3/08
(52) U.S. Cl. .............................. 701/51; 701/55; 701/61; 477/124; 477/155; 477/80; 74/339; 74/359; 74/64

(58) Field of Search ............................... 701/51, 54, 55, 701/61, 64, 67; 477/124, 155, 80, 905, 110, 154, 174, 13, 5; 74/339, 359, 360, 644, 745, 863, 866

(56) References Cited

U.S. PATENT DOCUMENTS

| 5,313,856 | A  | * | 5/1994 | Schneider et al. ............ 477/80 |
| 6,560,521 | B1 | * | 5/2003 | Sakamoto et al. ............ 701/51 |
| 6,776,062 | B2 | * | 8/2004 | Sunaga et al. ................ 74/339 |

FOREIGN PATENT DOCUMENTS

| DE | 198 59 458 A1 | 6/1999 |
| DE | 198 44 783 A1 | 3/2000 |

* cited by examiner

Primary Examiner—Thomas G. Black
Assistant Examiner—Arthur D. Donnelly
(74) Attorney, Agent, or Firm—Darby & Darby

(57) ABSTRACT

A method of changing gear in an automated transmission system of a motor vehicle having a multi-ratio gearbox with an input shaft and an output shaft, a take-up clutch located between the input shaft and an output shaft of an engine, a number of pairs of intermeshing gears.

22 Claims, 4 Drawing Sheets

TRANSMISSION SYSTEMS

The application is a continuation of International Patent Application Ser. No. PCT/DE02/01720, filed May 14, 2002, published in German, which is hereby incorporated by reference in its entirety.

The present invention relates to transmission systems and in particular to a transmission system for a motor vehicle comprising a multi-ratio gearbox including a power shifting clutch which enables gear changes to be made under power.

With conventional motor vehicle transmission systems in which a multi-ratio gearbox is connected to the engine of a vehicle by a friction clutch, the friction clutch is released in order to change from one gear to another. With this form of transmission, there is always a break in the pulling power during a shifting process, while the clutch is released to change the gear ratio.

GB 2,348,255 the disclosure of which explicit reference is made and whose content is expressly incorporated in the disclosure content of the present application, discloses a transmission system in which a first clutch is provided for start-up and a second power shifting clutch is provided to permit a change of gear ratio, while torque is continuously transmitted through the gearbox.

In accordance with one embodiment of the transmission disclosed in GB 2,348,255, the transmission system includes the gearbox having an input shaft which is connected to the engine of the vehicle via a start-up clutch and an output shaft which is connected to the driven wheels of a vehicle.

Several pairs of gears are mounted, one gear of each pair on the input shaft and the other gear of each pair on the output shaft, each pair of gears providing a different gear ratio. A first gear of each pair is rotatably fixed with respect to the shaft on which it is mounted, while the second gear of each pair is mounted on its associated shaft for rotation relative thereto. Sliding sleeve clutches, for example, synchromesh units or dog clutches are provided for coupling of second gears of each of the other pairs of gears to their associated shafts. A power shifting clutch is further provided for rotatably coupling the second gear of one of the pairs of gears, preferably that providing the highest gear ratio, for example fifth gear, to the associated shaft; and With the transmission system described above, when starting from neutral, the starting clutch is released while the start-up gear is engaged. However, for changes on the move from one gear to another, the start-up clutch remains engaged. To change from, for example, the first gear ratio to the second gear ratio, the power shifting clutch is engaged, so that the torque initially transmitted from the input shaft to the output shaft through the first gear ratio, will gradually be diverted so that it is transmitted through the power shifting clutch and fifth gear ratio. When the torque transmitted by the first gear ratio reduces to zero, the synchromesh unit or dog clutch by which the first gear is rotatably coupled to the associated shaft, may be released. Further engagement of the power shifting clutch and/or reduction is engine torque by, for example, control of the fuelling thereof, will then cause the engine and input shaft of the gearbox to slow down, until the speed of the input shaft will be synchronised to that appropriate for the second gear ratio for the current vehicle speed. The second gear may then be engaged. The power shifting clutch is then released so that the torque transmitted by the shifting clutch and fifth gear ratio is transferred back through the second gear ratio.

In the manner described above, torque is continuously transmitted through the gearbox during the gear change.

The present invention relates to the synchronisation of the target gear during such changes.

According to one aspect of the present invention a method of changing gear in an automated transmission system of a motor vehicle including:

a multi-ratio gearbox having at least two shafts including an input shaft and an output shaft;

a take-up clutch located between the input shaft and an output shaft of an engine by which torque may be transmitted between the engine and the input shaft;

a number of pairs of intermeshing gears, one gear of each pair being mounted in fixed rotational relationship with one of said shafts and the other gear of each pair being rotatably mounted with respect to another shaft;

the rotatably mounted gears of each pair of gears having means for selectively rotatably securing the gears to said other shaft;

a power shifting clutch being adapted to rotatably secure the rotatably mounted gear of a first pair of gears to said other shaft; and means for sensing the speed of the input shaft and the speed of the output shaft of the gearbox;

in which when the vehicle is in motion, the take-up clutch will be engaged to transmit torque from the engine to the input shaft of the gearbox and the rotatably mounted gear of one pair of gears is rotatably secured to said other shaft to engage said pair of gears and transmit torque from the input shaft to the output shaft; said method comprising:

a) engaging the power shifting clutch so that the torque transmitted through the currently engaged gear is gradually diverted through the power shifting clutch and said first pair of gears associated therewith;

b) when the torque transmitted by the power shifting clutch is equal to the engine torque, within prescribed limits, the currently engaged gear is disengaged;

c) following disengagement of the currently engaged gear, the power shifting clutch and/or the engine are controlled to increase the torque difference between the torque transmitted by the power shifting clutch and the torque produced by the engine, to a first predetermined value, so as to bring the synchronisation speed $\Delta\omega$ towards zero, where:

synchronisation speed $\Delta\omega = \omega_{mot} - i\omega_{lsk}$ where; $\omega_{mot}$ = the input shaft speed;
$\omega_{lsk}$ = the output shaft speed; and
i = the gear ratio of a target gear;

d) after a first predetermined time period the power shifting clutch and/or engine being controlled to reduce the difference between the torque transmitted by the power shifting clutch and the torque produced by the engine so that the synchronisation speed and acceleration of the input shaft level off towards zero; and e) engaging the relatively rotatable gear of the target gear with said other shaft, when the synchronisation speed is at zero, within prescribed limits.

In the above manner the input shaft speed and the output shaft speed may be brought quickly into synchronisation, so that the gear change may be completed quickly and smoothly.

The predetermined difference in torque levels of the power shifting clutch and/or engine may be achieved by a step, a ramp or a non-linear command path. The step command has the advantage that simple analytical solutions exist for calculating the timing of the power shifting clutch and engine torques. Another advantage of the step command is that it minimises synchronisation time. A disadvantage of the step command is that driver comfort might not be satisfactory for large steps in torque and, in this case, a ramp command may be more beneficial.

The predetermined torque difference to which the power shifting clutch and/or engine are shifted will depend on the particular gear shift, criteria relating to driver comfort and physical limitations of the system. The greater the difference between the engine torque and the shifting clutch torque, the faster the gear shift should be achieved, however the difference must not be so large, particularly in a case of step commands, since this will affect shift comfort negatively.

While in order to achieve the fastest possible gear change it is preferable to shift the engine torque and power shifting clutch torques in opposite directions to achieve the greatest possible difference, within the other constraints, this is not always necessary or even feasible. Alternatively, only one of the engine torque or power shifting clutch torque need be shifted, the other remaining at the torque at which the old gear was disengaged. Such a situation may arise when disengagement torque is close to zero or close to the maximum engine torque.

For up-shifts of gear it is necessary to reduce the speed of the input shaft during the synchronisation phase. Consequently the shifting clutch torque is preferably increased while the engine torque is preferably reduced. For downshifts, the input shaft speed must be increased and consequently the shifting clutch torque is preferably reduced while the engine torque in increased.

The time period after which the difference in torque is reduced, can be calculated in simple manner, provided step commands for the torques are used and the vehicle speed is assumed to be constant during synchronisation. Preferably, a common time period is used for switching both the engine torque and the power shifting clutch torque levels to reduce the difference therebetween. It is however possible to switch the levels at different times, but this complicates calculation of switching times and has only marginal potential for improvement in the gear shift quality.

When the torque difference is reduced in this manner, both the power shifting clutch torque and the engine torque may be returned to the torque level at which the currently engaged gear was disengaged. However, according to a further embodiment of the invention, the power shifting clutch torque and the engine torque are brought back to different levels to reduce the difference in torques, for example, in order to take account of variations in the vehicle speed during the gear shift.

The method above makes various assumptions, for example:
 a) that the dynamic response of the power shifting clutch and engine are first order and makes assumptions on parameters such as response delays and time constants that are not exactly known prior to each gear shift;
 b) that the power shifting clutch and engine torques are identical at the time of disengagement of the currently engaged gear;
 c) that the vehicle speed is constant during the synchronisation phase of the gear change; and
 d) that there are no random disturbances in the drive line.

Because in reality these assumptions are not exactly correct, a closed loop feedback system is preferably used to assure correct convergence of the synchronisation speed and acceleration of the input shaft, to zero.

In accordance with a preferred embodiment of the present invention, the power shifting clutch is further controlled so that the torque transmitted by the power shifting clutch is a function of the input and output shaft speeds, so as to bring the synchronisation speed and/or acceleration of the input shaft, to zero.

According to one embodiment, the closed loop feedback control is preferably only applied as synchronisation speed and input shaft acceleration approach zero. This may be achieved by activating a feedback controller at a predetermined time period after disengagement of the currently engaged gear, this may be the same time at which the engine and/or power shifting clutch torque levels are switched to reduce the torque difference. The input shaft acceleration, power shifting clutch torque and/or engine torque may also affect the time at which the feedback control is activated. Alternatively, the feedback controller may be activated when certain system variables reach a predetermined threshold value, for example when the synchronisation speed $\Delta\omega$ is less than a certain prescribed limit.

With this type of feedback control it is difficult to tune the controller for a wide range of synchronisation speeds. The controller must consequently be engaged as late as possible, but not too late to be able to smoothly regulate the synchronisation speed. The success of this type of control strategy depends critically on the speed of the power shifting clutch actuator.

According to an alternative embodiment, the feedback controller may be arranged to control the power shifting clutch, so that the synchronisation speed follows a predetermined path which eventually converges to zero. Using this strategy the feedback controller will be activated at the time of disengagement of the currently engaged gear, without slowing down synchronisation and still maintaining the advantage of feedback control.

The present invention is now described, by way of example only, with reference to the accompanying drawings in which.

Figure 1:
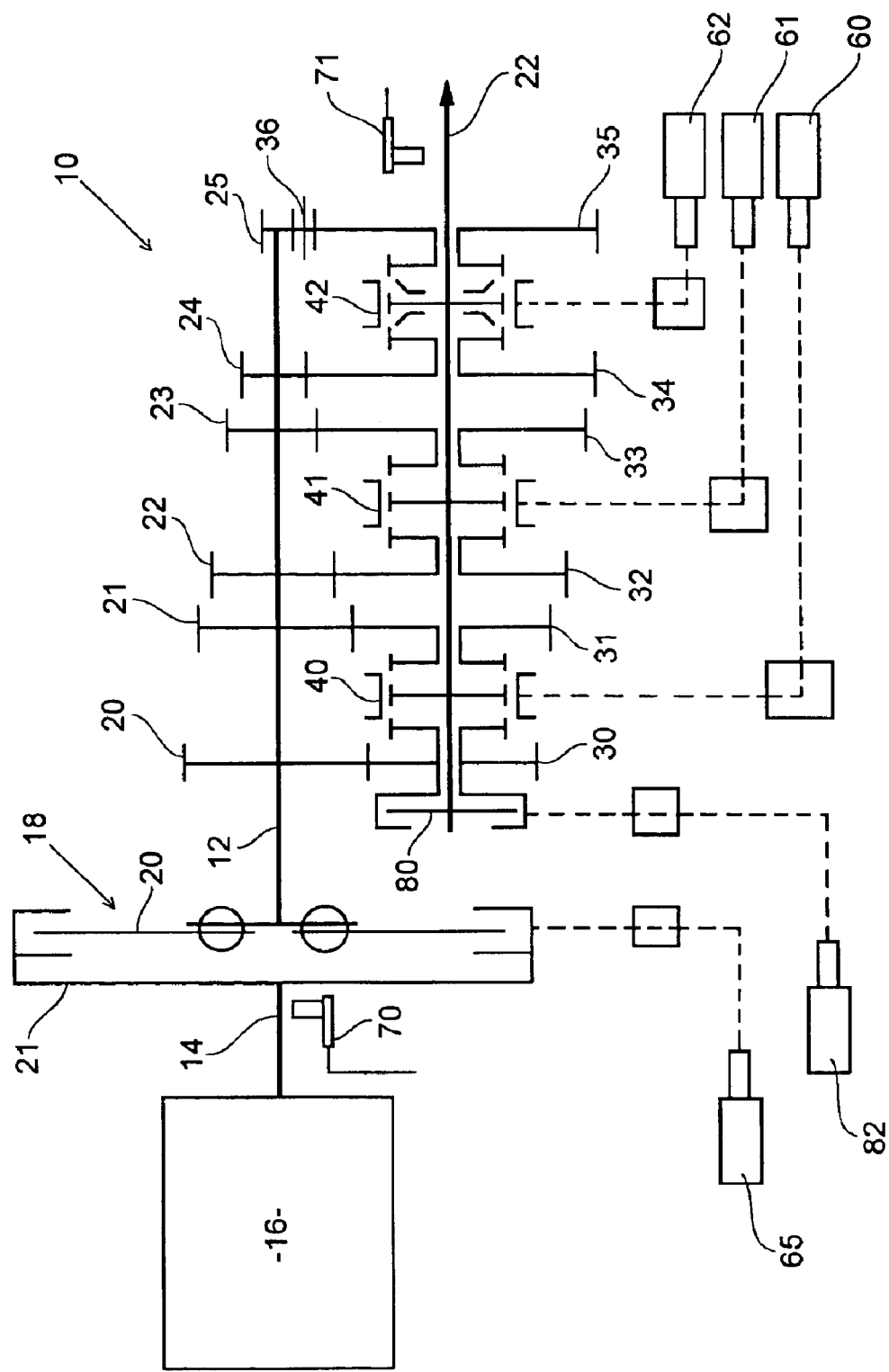
FIG. 1 is a diagrammatic illustration of a transmission system of the type to which the present invention relates.

As illustrated diagrammatically in FIG. 1, the transmission system of a motor vehicle comprises a gearbox 10. An input shaft 12 of the gearbox 10 is connected to the output shaft 14 of an engine 16, via a friction take-up clutch 18. The take-up clutch 18 is of conventional design comprising a driven plate 20, which is mounted for rotation with the input shaft 12 of the gearbox 10, the driven plate 20 being adapted to selectively frictionally engage a flywheel 21 mounted for rotation with the output shaft of the engine 16.

An actuator 65 is provided for engagement and disengagement of take-up clutch 18. The actuator 65 may be a hydraulic, a pneumatic or an electric actuator. According to a preferred embodiment of the invention, take-up clutch 18 will be engaged when actuator 65 is de-energised.

An output shaft 22 from the gearbox 10 is mounted parallel to the input shaft 12. A series of gears 20 to 25 are mounted on the input shaft 12 for rotation therewith. A corresponding series of gears 30 to 35 are mounted on the output shaft 22 for rotation relative thereto. Gears 20 to 24 and gears 30 to 34 are arranged in intermeshing pairs and are sized to provide different gear ratios; gears 20 and 30 providing a fifth gear ratio; gears 21 and 31 providing a fourth gear ratio; gears 22 and 32 providing a third gear ratio; gears 23 and 33 providing a second gear ratio; and gears 24 and 34 providing a first gear ratio. A further gear 36 meshes between gears 25 and 35 to reverse the direction of rotation and provide a reverse gear ratio.

Sliding sleeve clutches 40,41,42, for example dog clutches or synchromesh units, are provided between the gears 30 and 31; 32 and 33; and 34 and 35, respectively. Axial movement of the clutch 40 to the left as illustrated in FIG. 1 will thereby rotatably secure gear 30 to the output shaft 22, while axial movement of clutch 40 to the right will rotatably secure gear 31 to the output shaft 22. Likewise, axial movement of clutch 41 will selectively rotatably secure gear 32 or gear 33 to the output shaft 22 and axial movement of the clutch 42 will selectively rotatably secure gear 34 or gear 35 to the output shaft 22. Actuators 60,61,62 are provided for controlled axial movement of the clutches 40,41,42 respectively. The actuators 60,61,62 may be hydraulic, pneumatic or electric actuators.

A power shifting clutch 80 is furthermore provided for selectively rotatably connecting gear 30 to the output shaft 22. The power shifting clutch 80 is preferably a friction clutch. An actuator 82 is provided for controlling engagement and disengagement of the power shifting clutch 80. The actuator 82 may be a hydraulic, a pneumatic or an electric actuator, which is under automatic control of a control unit, enabling control of the power shifting clutch 80 during a gear change. According to a preferred embodiment of the invention, clutch 80 will be disengaged when the actuator 82 is de-energised.

Speed sensors 70 and 71 are provided for monitoring the speed of rotation of the gearbox input shaft 12 and output shaft 22 and providing signals proportional thereto which are sent to the control unit.

With the transmission system disclosed above, when the vehicle is stationery with the gearbox in neutral, the clutches 40,41 and 42 will be at their mid-positions, so that all of the gears 30 to 35 will be rotatable relative to the output shaft 5. Take-up clutch actuator 65 will be de-energised so that clutch 18 is engaged and power shifting clutch actuator 82 will be de-energised so that clutch 80 will be disengaged. Consequently, even though clutch 18 is engaged, no drive will be transmitted to the output shaft 22.

To engage a take-up gear, for example first gear, the actuator 65 is energised to disengage take-up clutch 18. Clutch 42 is then moved by actuator 62 to the left, as illustrated in FIG. 1, so that gear 34 is rotatably secured to the output shaft 22. The actuator 65 may then be de-energised to re-engage clutch 18, so that torque will be transmitted from the engine 16, through the output shaft 14, the clutch 18, input shaft 12, and gears 24 and 34, to the output shaft 22.

In order to change gear on the move, for example from first to second gear ratio, the take-up clutch 18 remains engaged. Actuator 82 is energised to engage the power shifting clutch 80. As the plates of the power shifting clutch 80 move into engagement, torque transmitted from the input shaft 12 to the output shaft 22 is gradually transferred from the first gear ratio (gears 24 and 34) to clutch 80 and gears 20 and 30. When the torque transmitted by clutch 80 is equal to the engine torque, then clutch 42 may be moved by actuator 62, back to its mid-position, thereby disengaging gear 34 from the output shaft 22 and disengaging first gear. The power shifting clutch 80 is then further engaged and/or the engine torque is reduced, until the speed of the input shaft 12 is synchronised to that of the output shaft 22, for the new (second) gear 23,33 to be engaged. The second gear 23,33 may then be engaged by moving the clutch 41, by means of actuator 61, to the right as illustrated in FIG. 1, thereby rotatably securing gear 33 to the output shaft 22.

Clutch 80 may then be disengaged by means of actuator 82, while clutch 18 remains engaged, thereby transferring torque back from the clutch 80 to the second gear ratio, gears 23 and 33.

In the manner described above, torque is transmitted continuously through the transmission system during the change from one gear to the other.

When shifting from one gear to the other in the manner described above, it is desirable to synchronise the speeds of the input shaft and output shafts 12 and 22, after disengagement of the old gear and before engagement of the new gear, as quickly as possible, without detriment to drive comfort.

Figure 2:
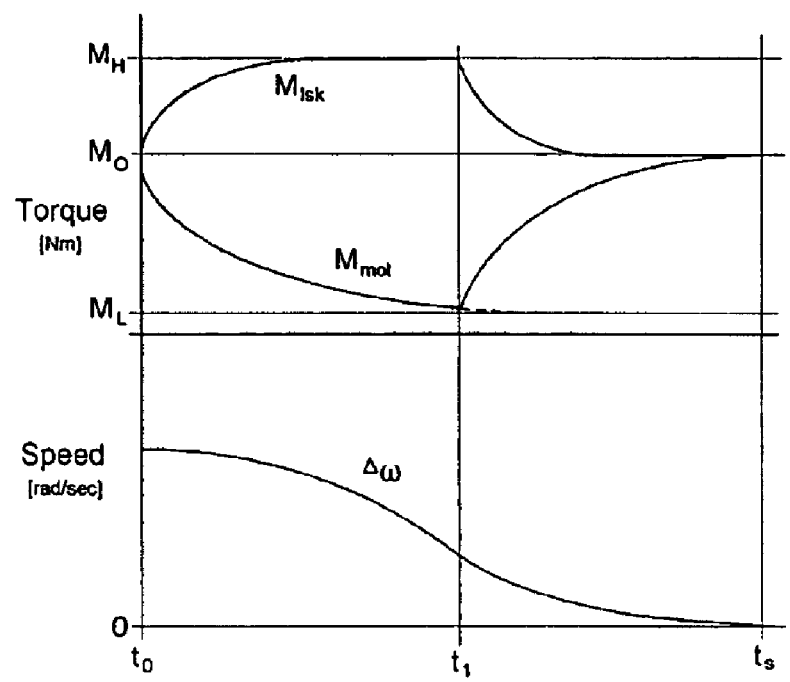
FIG. 2 is a plot of engine torque $M_{mot}$, power shifting clutch torque $M_{Isk}$, and synchronisation speed $\Delta\omega$ against time, for an up-shift of the transmission system illustrated in FIG. 1.

In accordance with the present invention, as illustrated in FIG. 2, when the old gear (first gear) is disengaged at time $t_o$, the torque transmitted by the clutch 80 $M_{lsk}$ is equal to the engine torque $M_{mot}$, is equal to $M_o$. For an upchange, ie from first to second gear ratio, at disengagement time $t_o$, the clutch 80 is further engaged to step up the torque $M_{lsk}$ transmitted thereby, towards a predetermined torque $M_H$; while the engine 18 is controlled to step down the torque $M_{mot}$, towards a predetermined value $M_L$. The values $M_H$ and $M_L$ depend on the gear change involved.

In this manner, the synchronisation speed $\Delta\omega$ which is the difference between the input shaft speed and the product of the output shaft speed and the new gear ratio, reduces towards zero, as illustrated in FIG. 2. The greater the difference between $M_H$ and $M_L$, the more quickly the synchronising speed $\Delta\omega$ approaches zero.

After a predetermined time period, at switching time $t_1$, the engine torque $M_{mot}$ and the torque $M_{lsk}$ transmitted by clutch 80 are stepped back towards $M_o$, so that the synchronising speed $\Delta\omega$ and input shaft speed acceleration $\Delta\dot{\omega}$ converge to zero smoothly as illustrated in FIG. 2.

When the synchronisation speed reaches zero or within prescribed limits thereof, the new gear may be engaged in the manner described above.

For a disturbance free dynamic model and assuming that the vehicle speed is constant during the synchronisation of the input and output shaft speeds, and that the engine and shifting clutch torques are equal at time $t_o$ when the old gear is disengaged; the switching time:

$$t_0 = J_{mot} \frac{\Delta\omega_O}{M_H - M_L}$$

where;

$J_{mot}$=input inertia of the engine;

$\Delta\omega_o$=synchronising speed at time $t_o$; and;

$\Delta\omega^o = \omega_{mot} - i\omega_{lsk}$ (at time $t_o$);

where;

$\omega_{mot}$=input shaft speed;

$\omega_{lsk}$=output shaft speed;

i=new gear ratio.

According to the example illustrated in FIG. 2, where the vehicle speed is 30 km/h and the disengagement torque $M_o = 30N_m$; the torque reference value $M_H$ will typically be $70N_m$ and torque reference value $M_L$ will typically be zero, the switching time for a change from first to second, will typically be of the order of 0.5 seconds.

Figure 3:
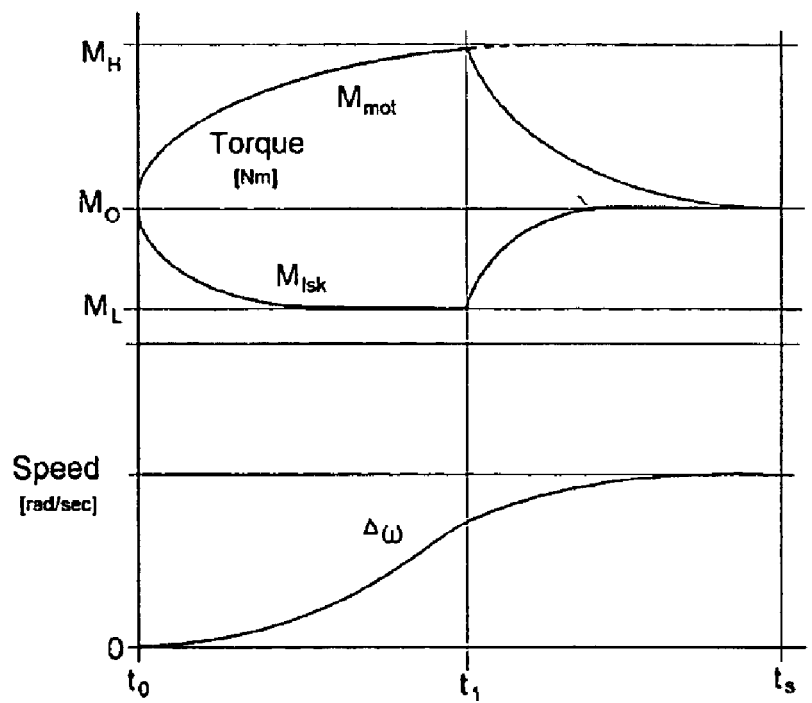
FIG. 3 is a plot similar to FIG. 2 for a down-shift.

As illustrated in FIG. 3, a similar strategy may be adopted for down-shifts. However, in the down-shift, the input shaft speed must be speeded up in order to synchronise it with the output speed, consequently at time $t_o$, the engine torque is increased to $M_H$ and the torque transmitted by the clutch is decreased to torque $M_L$.

Figure 4:
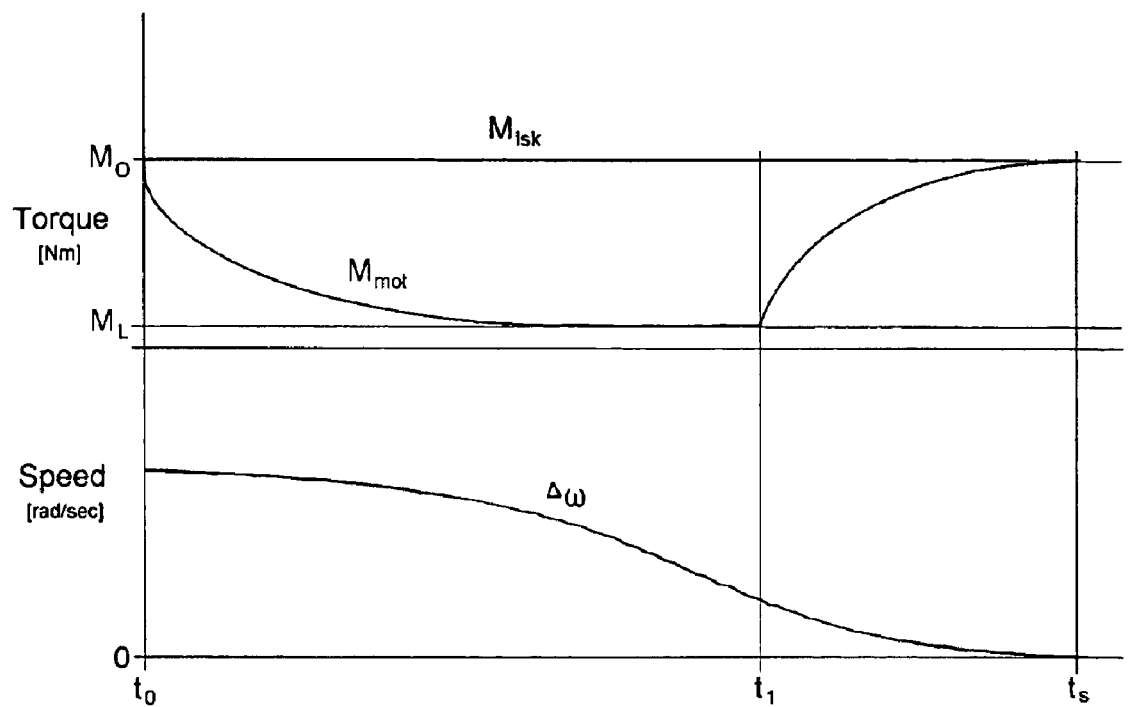
FIG. 4 is a plot similar to FIG. 2 illustrating an alternative control strategy for an up-shift.

In the embodiment illustrated in FIG. 4, at time $t_o$, the engine torque is reduced to torque $M_L$, while the torque transmitted by the clutch 80 remains at $M_o$.

While this may be necessary under certain circumstances, the switching time and consequently the synchronising time will be increased significantly.

For example, for a vehicle travelling at 30 km/h and having a disengagement torque $M_o=30N_m$; the reference torque values $M_H=30N_m$ and $M_L=0N_m$, then the switching time is increased to 1.2 seconds.

In the dynamic model described above, it is assumed that vehicle speed is constant during synchronisation of the input and output shaft speeds. However the vehicle will typically accelerate during synchronisation. As the output inertia of the gearbox is quite high compared to the input inertia, it is reasonable to assume that vehicle acceleration will be constant during synchronisation. Under such circumstances, the synchronisation speed:

$$\Delta\omega = \Delta_{mot} - i\{\omega_{lsg} + a_{frg}[t_1 - t_o]\}$$

where;

$a_{frg}$ = de-acceleration of the vehicle.

Under these circumstances, the switching time:

$$t_1 = J_{mot} \frac{\Delta\omega_O}{M_H - M_L + J_i a_{frg}}$$

Figure 5:
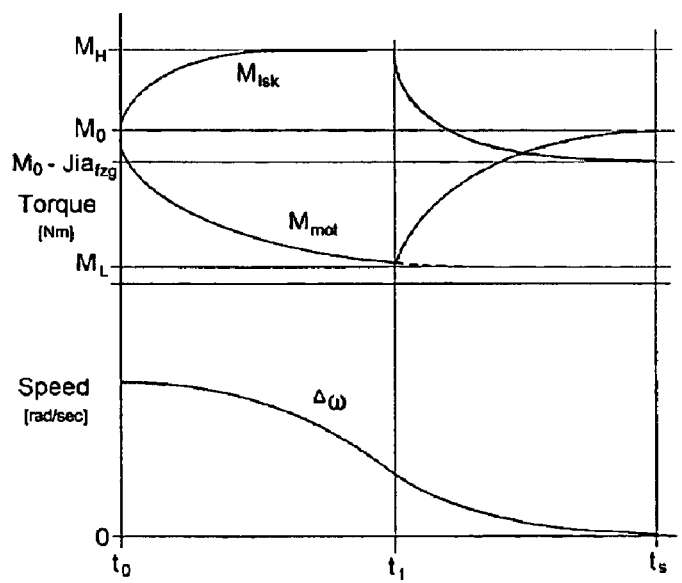
FIG. 5 is a plot similar to FIG. 2 illustrating a further modified control strategy for a up-shift.

As illustrated in FIG. 5, constant vehicle acceleration can consequently be accounted for by calculating the switching time $t_1$ in accordance with the above equation. Moreover, for a change up, for example from first to second, at the switching time $t_1$, the clutch torque is reduced towards $M_o - Jia_{fzg}$ while the engine torque is increased towards $M_o$, the acceleration $a_{fzg}$ being measured at time $t_o$.

In order to account for other deviations from the idealised dynamic model, a closed feedback control system is provided to ensure that the synchronisation speed and the input shaft acceleration converge accurately and smoothly towards zero during the synchronisation phase of the gear change.

Figure 6:
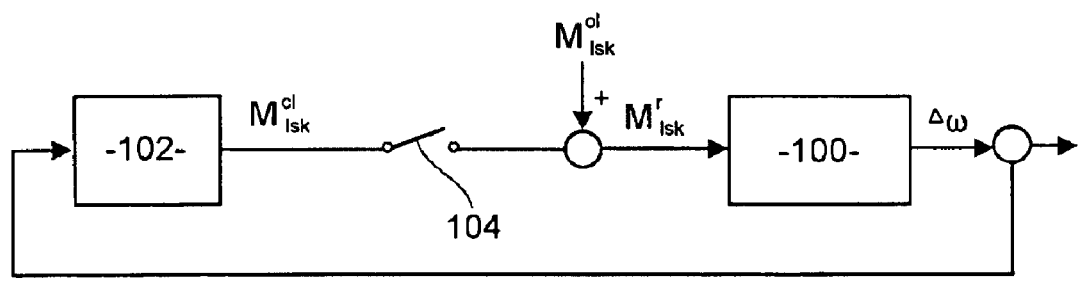
FIG. 6 is a block diagram of a closed loop feedback system used in the transmission system illustrated in FIG. 1.

As illustrated in FIG. 6, in accordance with one embodiment of the invention, engagement of the power shifting clutch 80 is controlled by means of the actuator 82, under the control of an electronic control unit 100. The control unit 100 responds to an output signal corresponding to the clutch reference torque $M^{ol}_{lsk}$ which may be $M_H$; $M_L$; $M_o - Jia_{fzg}$, depending on whether it is an up-shift, a down-shift or whether vehicle acceleration during synchronisation is taken into account, as disclosed above.

In the embodiment illustrated in FIG. 6, an input equal to the open loop shifting clutch reference torque $M^{ol}_{lsk}$ is applied to the control unit 100. The resulting actual synchronisation speed $\Delta\omega$ is calculated by the control unit 100, using signals representative of the input shaft speed from sensor 70, output shaft speed from sensor 71 and the known target gear ratio. The actual synchronisation speed is then fed to a feedback controller 102, which produces a clutch reference torque correction value $M^{cl}_{lsk}$ which is added to $M^{ol}_{lsk}$ to provide a corrected clutch reference torque value $M^{r}_{lsk}$ which is applied to the control unit 100.

With this closed loop feedback system it is difficult to tune the system for large synchronisation speed values. Switching means 104 is consequently provided, so that the feedback control is only used as the synchronisation speed approaches zero. The switching means 104 may be arranged to close at a given time after the disengagement time $t_o$, for example at the switching time $t_1$. Alternatively, the switching means 104 may be arranged to be closed, when the synchronisation speed falls below a predetermined value.

Figure 7:
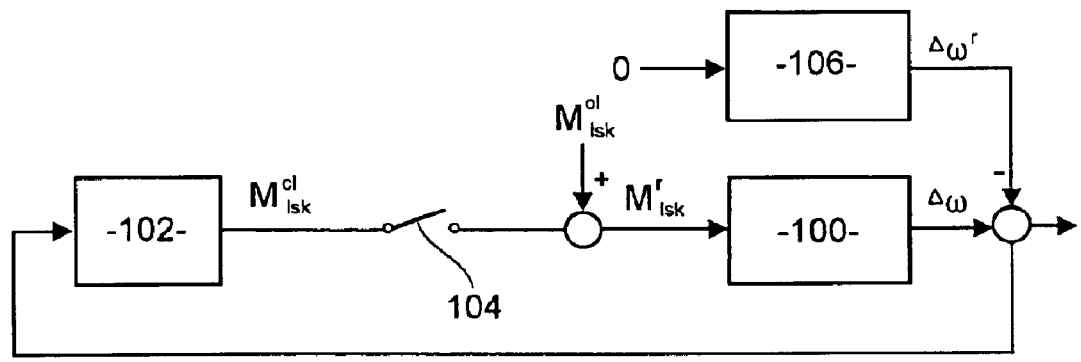
FIG. 7 is a block diagram of a modified closed loop feedback system.

In the modification illustrated in FIG. 7, a system model block 106 calculates a reference synchronisation speed signal $\Delta\omega^r$, based on the open loop control disclosed above. The reference synchronisation speed signal $\Delta\omega^r$ is then compared with the actual synchronisation speed $\Delta\omega$ determined by control unit 100 and the feedback controller 102 produces a correction value $M^{cl}_{lsk}$ corresponding to the difference between the actual synchronisation speed $\Delta\omega$ and the reference synchronisation speed $\Delta\omega^r$. The closed loop feedback thereby attempts to track an ideal synchronisation speed curve. With this closed loop feedback system, the feedback controller operates continuously from the disengagement time $t_o$, until synchronisation is achieved.

The feedback controller 102 of the closed loop feedback systems disclosed above, may use proportional integral derivative (PIB) or on/off algorithms to calculate the clutch reference torque correction value $M^{cl}_{lsk}$.

Various modifications may be made without departing from the invention. For example, while in the embodiment described above one gear of each pair of gears is rotationally mounted on the gearbox output shaft, alternatively the relatively rotatable gears may be mounted on the gearbox input shaft or on an intermediate lay shaft located between the gearbox input and output shafts. According to a further alternative, some relatively rotatable gears may be mounted on the gearbox input shaft, some mounted on the gearbox output shaft and/or some on an intermediate lay shaft.

Similarly the power shifting clutch may be adapted to rotatably secure the rotatably mounted gear of the first pair of gears to the geabox input shaft, the gearbox output shaft or an intermediate lay shaft.

Furthermore while it is advantageous that the first pair of gears correspond to the highest gear ratio, any other gear ratio my be selectively connected by the power shifting clutch.

The patent claims submitted with the application are proposed formulations without prejudice to the achievement of further patent protection. The applicant reserves the right to submit claims for further combinations of characteristics, previously only disclosed in the description and/or drawings.

References back used in sub-claims refer to the further development of the subject of the main claim by the characteristics of the respective sub-claim; they are not to be understood as a waiver with regard to achieving independent item protection for the combination of characteristics in the related sub-claims.

Since the subject of the sub-claims can form separate and independent inventions with reference to the prior art on the priority date, the applicant reserves the right to make them the subject of independent claims or of division declarations. Furthermore, they may also contain independent inventions which demonstrate a design which is independent of one of the objects of the preceding sub-claims.

The embodiments are not to be considered a restriction of the invention. Rather, a wide range of amendments and modifications is possible within the scope of the current disclosure, especially those variations, elements and combinations and/or materials which, for example, the expert can learn by combining individual ones together with those in the general description and embodiments in addition to characteristics and/or elements or process stages described in the claims and contained in the drawings with the aim of solving a task thus leading to a new object or new process stages or sequences of process stages via combinable characteristics, even where they concern manufacturing, testing and work processes.

What is claimed is:

1. A method of changing gear in an automated transmission system of a motor vehicle including:
   a multi-ratio gearbox having at least two shafts including an input shaft and an output shaft;
   a take-up clutch located between the input shaft and an output shaft of an engine by which torque may be transmitted between the engine and the input shaft;
   a number of pairs of intermeshing gears, one gear of each pair being mounted in fixed rotational relationship with one of said shafts and the other gear of each pair being rotatably mounted with respect to another shaft;
   the rotatably mounted gears of each pair of gears having means for selectively rotatably securing the gears to said other shaft;
   a power shifting clutch being adapted to rotatably secure the rotatably mounted gear of a first pair of gears to said other shaft; and
   means for sensing the speed of the input shaft and the speed of the output shaft of the gearbox;
   in which when the vehicle is in motion, the take-up clutch will be engaged to transmit torque from the engine to the input shaft of the gearbox and the rotatably mounted gear of one pair of gears is rotatably secured to said other shaft to engage said pair of gears and transmit torque from the input shaft to the output shaft; said method comprising:
   a) engaging the power shifting clutch so that the torque transmitted through the currently engaged gear is gradually diverted through the power shifting clutch and said first pair of gears associated therewith;
   b) when the torque transmitted by the power shifting clutch is equal to the engine torque, within prescribed limits, the currently engaged gear is disengaged;
   c) following disengagement of the currently engaged gear, the power shifting clutch and/or the engine are controlled to increase the torque difference between the torque transmitted by the power shifting clutch and the torque produced by the engine, to a first predetermined value, so as to bring the synchronisation speed $\Delta\omega$ towards zero, where:

synchronisation speed $\Delta\omega = \omega_{mot} - i\omega_{lsk}$ where; $\omega_{mot}$=the input shaft speed;
   $\omega_{lsk}$=the output shaft speed; and
   i=the gear ratio of a target gear;
   d) after a first predetermined time period the power shifting clutch and/or engine being controlled to reduce the difference between the torque transmitted by the power shifting clutch and the torque produced by the engine so that the synchronisation speed and acceleration of the input shaft level off towards zero; and
   e) engaging the relatively rotatable gear of the target gear with said other shaft, when the synchronisation speed is at zero, within prescribed limits.

2. A method according to claim 1 wherein, after disengagement of the currently engaged gear;
   a) the torque transmitted by the power shifting clutch is increased and/or the engine torque is reduced, for an up-shift; and
   b) the torque transmitted by the power shifting clutch is decreased and/or the engine torque is increased for a down-shift.

3. A method according to claim 2 wherein the torque transmitted by the power shifting clutch and/or engine torque are changed by a step, a ramp or a non-linear command path.

4. A method according to claim 1, wherein the first predetermined torque difference is a function of the gear shift, criteria related to driver comfort and/or limitations of the transmission system.

5. A method according to claim 1, wherein the torque difference is reduced to the second predetermined value by altering the torque transmitted by the power shifting clutch and the engine torque, at the same time.

6. A method according to claim 1, wherein the second predetermined value is zero.

7. A method according to claim 6, wherein the torque difference is reduced to the second predetermined value by returning the torque transmitted by the power shifting clutch and the engine torque, to the value thereof when the currently engaged gear was disengaged.

8. A method according to claim 1, wherein the predetermined time period $$t_0 = J_{mot} \frac{\Delta\omega_O}{M_H - M_L}$$

where;
$J_{mot}$=input inertia of the engine;
$\Delta\omega_o$=synchronising speed at time $t_o$;
$M_H - M_L$=the first predetermined torque difference.

9. A method according to claim 1, wherein the second predetermined torque difference is a function of vehicle acceleration during the synchronisation phase of the gear change.

10. A method according to claim 9, wherein the predetermined time period $$t_1 = J_{mot} \frac{\Delta\omega_O}{M_H - M_L + J_i a_{frg}}$$

where;
$a_{fzg}$=the vehicle acceleration
and $\Delta\omega = \omega_{mot} - i\{\omega_{fzg} + a_{fzg}[t-t_o]\}$.

11. A method according to claim 1, wherein the input and output shaft speeds of the gearbox are monitored and the actual synchronisation speed is determined from the input and output shaft speeds and the target gear ratio, the actual synchronisation speed being used in a closed feedback loop to ensure accurate and smooth reduction of the synchronisation speed to zero.

12. A method according to claim 11, wherein the feedback loop controls the amount of torque transmitted by the power shifting clutch, so as to adjust the first predetermined torque difference to a value appropriate for the instantaneous synchronisation speed.

13. A method according to claim 12, wherein the feedback loop is actuated when the synchronisation speed approaches zero.

14. A method according to claim 13, wherein the feedback loop is actuated after a second predetermined time period has elapsed from disengagement of the currently engaged gear.

15. A method according to claim 14, wherein the second predetermined time period coincides with the first predetermined time period.

16. A method according to claim 13, wherein the feedback loop is actuated when the synchronisation speed falls below a predetermined value.

17. A method according to claim 11, wherein the feedback loop compares the actual instantaneous synchronisation speed with a reference synchronisation speed and increases or decreases the torque transmitted by the power shifting clutch so that the first predetermined torque difference is adjusted in accordance with the difference between the actual and reference synchronisation speed.

18. A transmission system for a motor vehicle including:
a multi-ratio gearbox having at least two shafts including an input shaft and an output shaft;
a take-up clutch located between the input shaft and an output shaft of an engine by which torque may be transmitted between the engine and the input shaft;
a number of pairs of intermeshing gears, one gear of each pair being mounted in fixed rotational relationship with one of said shafts and the other gear of each pair being rotatably mounted with respect to another shaft;
the rotatably mounted gears of each pair of gears having means for selectively rotatably securing the gears to said other shaft;
a power shifting clutch being adapted to rotatably secure the rotatably mounted gear of a first pair of gears to said other shaft; and
means for sensing the speed of the input shaft and the speed of the output shaft of the gearbox; and
means for initiating a change from one gear to another; in which when the vehicle is in motion, the take-up clutch will be engaged to transmit torque from the engine to the input shaft of the gearbox and the rotatably mounted gear of one pair of gears is rotatably secured to said other shaft to engage said pair of gears and transmit torque from the input shaft to the output shaft;
means being provided which, upon actuation of the means for initiating a chance from one gear to another, for engaging the power shifting clutch so that the torque transmitted through the currently engaged gear is gradually diverted through the power shifting clutch and said first pair of gears associated therewith;
means being provided for disengaging the currently engaged gear when the torque transmitted by the power shifting clutch is equal to the engine torque, within prescribed limits;
means being provided by which, following disengagement of the currently engaged gear, the power shifting clutch and/or the engine are controlled to increase the torque difference between the torque transmitted by the power shifting clutch and the torque produced by the engine, to a first predetermined value, so as to bring the synchronisation speed $\Delta \omega$ towards zero, where:

synchronisation speed $\Delta \omega = \omega_{mot} - i\omega_{lsk}$ where; $\omega_{mot}$=the input shaft speed;
$\omega_{lsk}$=the output shaft speed; and
i=the gear ratio of a target gear;
means being provided to reduce the difference between the torque transmitted by the power shifting clutch and the torque produced by the engine, after a first predetermined time period has elapsed since disengagement of the currently engaged, so that the synchronisation speed and acceleration of the input shaft level off towards zero; and
means being provided for engaging the relatively rotatable gear of the target gear with said other shaft, when the synchronisation speed is at zero, within prescribed limits.

19. A transmission system according to claim 18 including a closed loop feedback which controls engagement of the power shifting clutch, to increase or decrease the torque transmitted thereby, between disengagement of the currently engaged gear and engagement of a target gear, so as to bring the synchronisation speed accurately and smoothly towards zero.

20. A transmission system according to claim 19, wherein the closed loop feedback controls the power shifting clutch in accordance with the instantaneous synchronisation speed as determined from the input shaft speed as monitored by input shaft speed sensor, the output shaft speed as monitored by the output shaft speed sensor and the known target gear ratio.

21. A transmission system according to claim 20, wherein switching means is provided for enabling the closed loop feedback as the synchronisation speed approaches zero.

22. A transmission system according to claim 19, wherein the closed loop feedback controls the power shifting clutch in accordance with a comparison of the actual instantaneous synchronisation speed; as determined from the input shaft speed as monitored by input shaft speed sensor, the output shaft speed as monitored by the output shaft speed sensor and the known target gear ratio; with a reference synchronisation speed.

* * * * *

UNITED STATES PATENT AND TRADEMARK OFFICE
CERTIFICATE OF CORRECTION

PATENT NO. : 6,871,131 B2
DATED : March 22, 2005
INVENTOR(S) : Martin Brandt et al.

It is certified that error appears in the above-identified patent and that said Letters Patent is hereby corrected as shown below:

Title page,
Item [73], Assignee: please delete "LuK Lamellen und kupplungsbau Beteiligungs KG, Buhl (DE)" and substitute -- LuK Lamellen und Kupplungsbau Beteiligungs KG, Buhl, (DE)" --.

Signed and Sealed this

Seventh Day of June, 2005

JON W. DUDAS
*Director of the United States Patent and Trademark Office*